June 9, 1964 R. Z. SCHREFFLER 3,136,999

NAVIGATIONAL GUIDE APPARATUS AND METHOD

Filed June 13, 1960 8 Sheets-Sheet 1

INVENTOR.
ROBERT Z. SCHREFFLER
BY Eaton, Bell, Hunt & Seltzer
ATTORNEYS

June 9, 1964 R. Z. SCHREFFLER 3,136,999

NAVIGATIONAL GUIDE APPARATUS AND METHOD

Filed June 13, 1960

8 Sheets-Sheet 2

INVENTOR.
ROBERT Z. SCHREFFLER
BY Eaton, Bell, Hunt & Seltzer
ATTORNEYS

INVENTOR.
ROBERT Z. SCHREFFLER
BY Eaton, Bell, Hunt & Seltzer
ATTORNEYS

June 9, 1964 R. Z. SCHREFFLER 3,136,999

NAVIGATIONAL GUIDE APPARATUS AND METHOD

Filed June 13, 1960 8 Sheets-Sheet 4

INVENTOR.
ROBERT Z. SCHREFFLER
BY Eaton, Bell, Hunt & Seltzer
ATTORNEYS

June 9, 1964 R. Z. SCHREFFLER 3,136,999

NAVIGATIONAL GUIDE APPARATUS AND METHOD

Filed June 13, 1960 8 Sheets-Sheet 5

INVENTOR.
ROBERT Z. SCHREFFLER
BY Eaton, Bell, Hunt & Seltzer
ATTORNEYS

June 9, 1964 R. Z. SCHREFFLER 3,136,999

NAVIGATIONAL GUIDE APPARATUS AND METHOD

Filed June 13, 1960 8 Sheets-Sheet 6

INVENTOR.
ROBERT Z. SCHREFFLER
BY Eaton, Bell, Hunt & Seltzer
ATTORNEYS

INVENTOR.
ROBERT Z. SCHREFFLER
BY Eaton, Bell, Hunt & Seltzer
ATTORNEYS

INVENTOR.
ROBERT Z. SCHREFFLER
BY Eaton, Bell, Hunt & Seltzer
ATTORNEYS

United States Patent Office 3,136,999
Patented June 9, 1964

3,136,999
NAVIGATIONAL GUIDE APPARATUS AND METHOD

Robert Z. Schreffler, Anderson, S.C.
(523 W. 6th S., Brigham City, Utah)

Filed June 13, 1960, Ser. No. 35,694
5 Claims. (Cl. 343—112)

This invention relates to an improved navigational guide apparatus and method for conveying to a pilot the attitude and location of his craft with respect to a given area of terrain, and for also conveying such information to a location remote from the pilot or craft.

Various attempts have been made heretofore to provide an efficient navigational guide system capable of notifying the pilot of an aircraft of his exact position relative to the earth. Such systems have included high frequency radio direction finding equipment and very high frequency omni-directional equipment, wherein both types of equipment would indicate the direction in which the aircraft is positioned with respect to a radio transmitter located on the ground. By tuning to the frequency of two or more radio transmitters spaced substantially from each other, the pilot of the aircraft could determine his position relative to earth with some degree of accuracy, as is well known. However, the pilot could not obtain information as to his exact location with respect to objects or obstructions on the ground in instances where the aircraft was flying at night or in foggy weather, or when clouds intervened between the aircraft and the land.

Other attempts have been made to provide a system whereby the pilot of the aircraft would be visually notified of objects along the line of travel of his aircraft. One such system has involved the use of a plurality of direction finders located at various fixed positions, such as on a landing field, and these direction finders would designate the position of the aircraft relative to a map corresponding to the terrain of the landing field. A television pick-up was associated with the map, which would transmit to the pilot the position of an element corresponding to the aircraft with respect to the map. Various other types of navigational systems have been devised for providing within an aircraft a visual representation of the land over which the aircraft was flying, although such land might be obscured by fog or clouds.

The prior navigational guide systems have not been satisfactory, however, due to the fact that such devices could not provide the pilot of an aircraft with a visual notification of objects located forwardly of and in alignment with the longitudinal axis of the aircraft regardless of the direction in which the aircraft might be heading within the plane of a given area of terrain. Also, prior navigational methods have required manual movement of the element adjacent the map of the terrain over which the aircraft was flying, or the pilot could only determine his position with respect to a fixed location.

It is an object of this invention to provide an improved navigational guide apparatus and method in which an element corresponding to an aircraft in flight is moved about its three principal axes and from place to place relative to a map of the terrain over which the aircraft is flying in exactly the same attitude and relationship to the relief map as the aircraft moves relative to the actual terrain, whereby anyone viewing said element is automatically notified of the exact attitude and position of the actual aircraft relative to the area of terrain embraced by the map.

It is another object of this invention to provide a method and apparatus of the character described wherein a television pick-up system transmits to the aircraft a moving picture of the map as observed with respect to the longitudinal axis of the element associated therewith so that the pilot of the aircraft is notified of objects directly ahead of the aircraft and objects adjacent thereto regardless of the direction of movement of the aircraft.

The present navigational guide apparatus and method may be used for guiding aircraft in flight, for guiding the pilot in landing his aircraft whether it be on land or on the deck of an ocean-going vessel, or at any other predetermined location.

It is another object of this invention to provide apparatus of the character described in association with a flight training aid, such as a flight simulator wherein the element or model aircraft may move about its three principal axes and from place to place in response to movement of the controls within the flight simulator.

This application is a continuation-in-part of my copending application Serial Number 494,471, filed March 15, 1955 and entitled Blind Instrument Landing System, now abandoned.

Some of the objects of the invention having been stated, other objects will appear as the description proceeds when taken in connection with the accompanying drawings, in which—

Figures 5, 6, 7, 8:
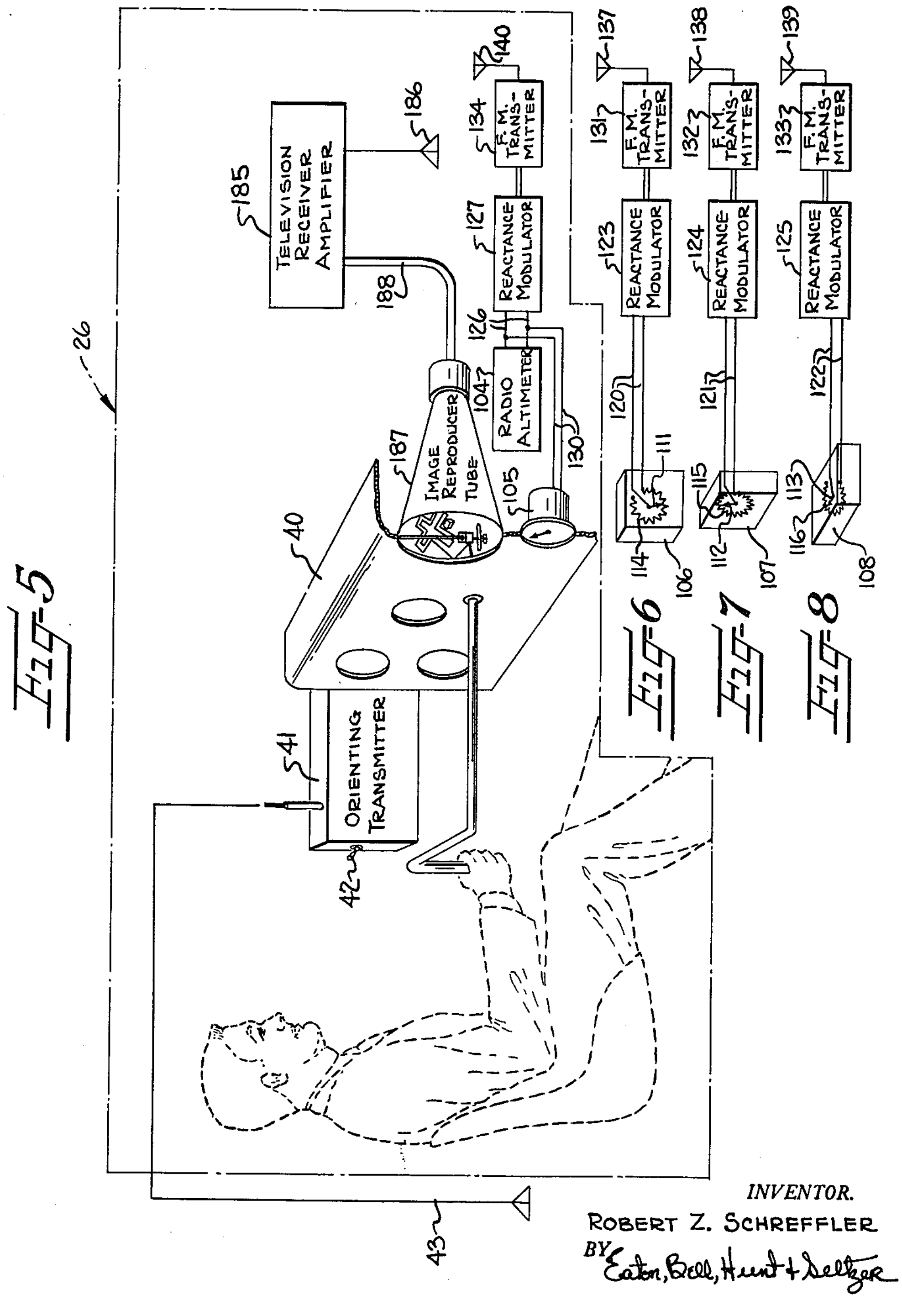
FIGURE 5 is a somewhat schematic view of an aircraft-type instrument panel showing a television receiving tube and radio altimeter mounted therein and showing diagrammatically, a radio altimeter transmitter in association with the radio altimeter.
FIGURES 6, 7 and 8 are schematic views of gyroscopic devices which may be supported in fixed relation to the aircraft and which respond to variation in movement of the aircraft about its lateral axis, its longitudinal axis and its vertical axis, respectively, and showing diagrammatically, radio transmission means associated with the respective gyroscopic devices.
Figure 9:
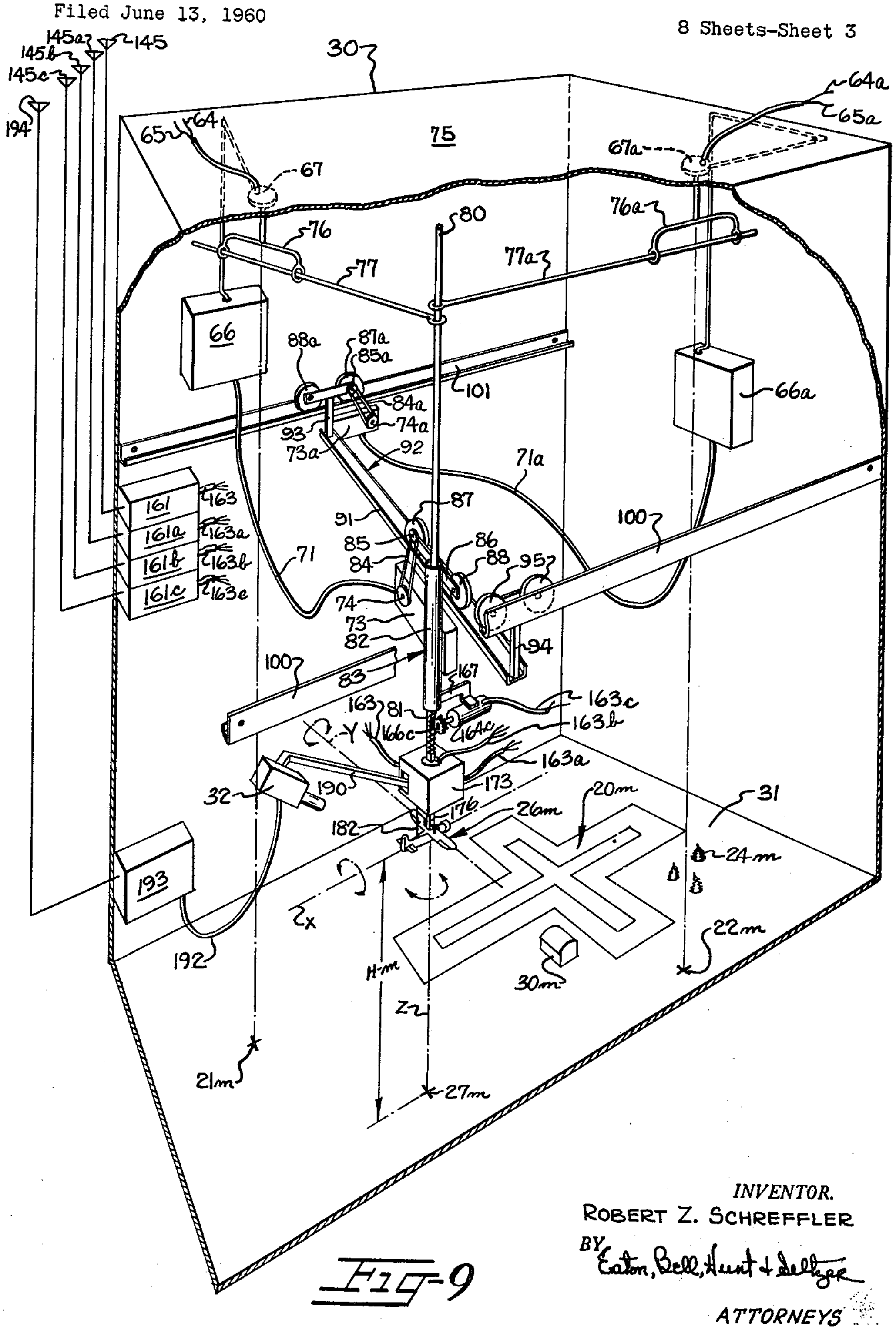
FIGURE 9 is an enlarged isometric view of the television transmitting station with portions thereof broken away and showing the apparatus for supporting and imparting movement to a model aircraft and an associated television camera relative to a relief map of the area of terrain shown in FIGURE 1.
Figure 15:
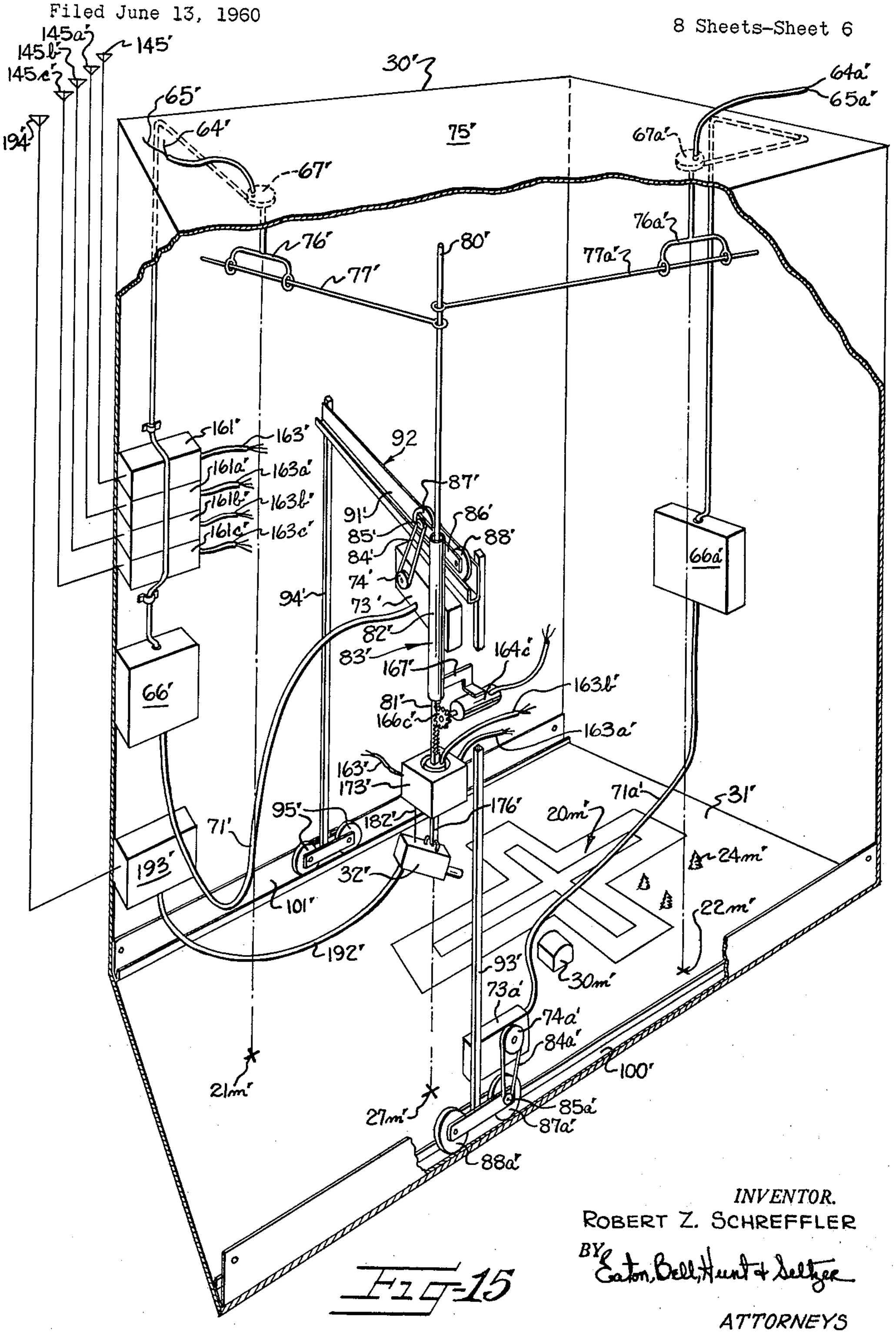
Figure 16:
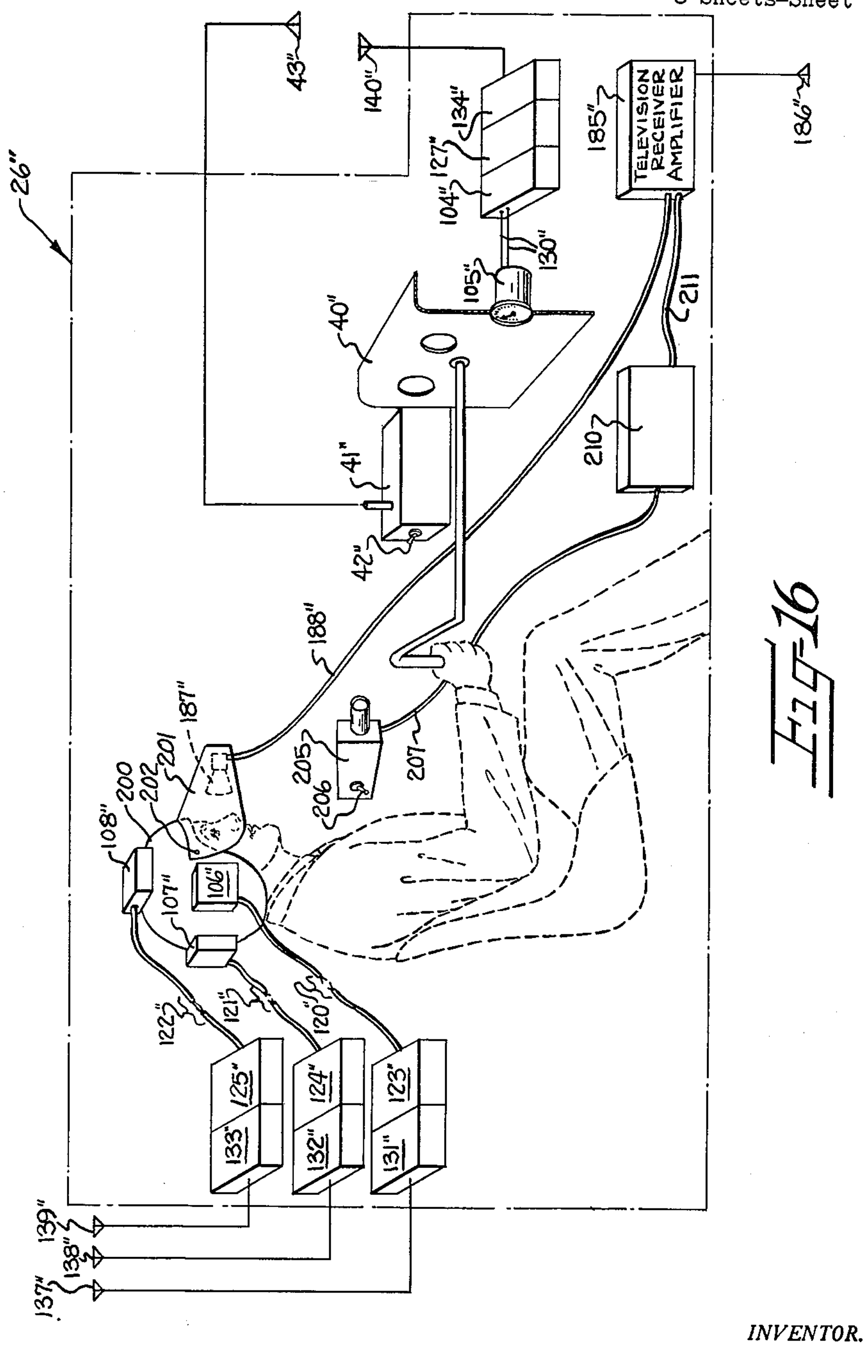
Figure 17:
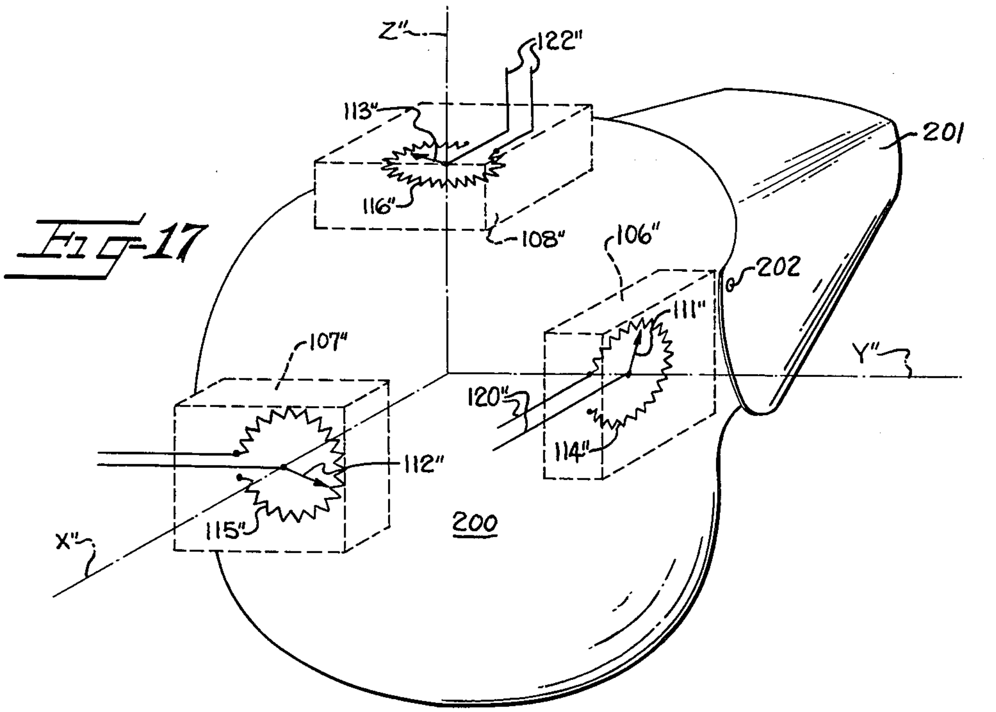
Figure 18:
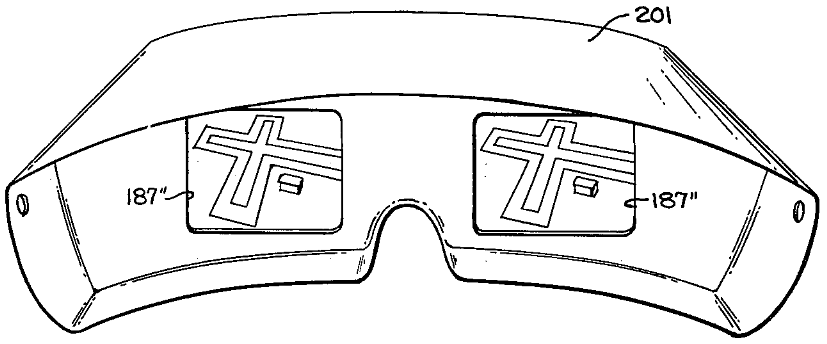

FIGURES 11, 12, 13 and 14 are diagrammatic views of devices for receiving signals from the transmitters associated with the climb gyroscope device, the bank gyroscope device, the turn gyroscope device and the radio altimeter shown in FIGURES 6, 7, 8 and 5, respectively, and for converting such signals to respectively move the model aircraft about its lateral axis, move the model aircraft about its longitudinal axis, move the model aircraft about its vertical axis, and to raise and lower the model aircraft relative to the relief map shown in FIGURE 9;

FIGURE 15 is a view similar to FIGURE 9 showing a second form of means for supporting and imparting movement to the element representing the actual aircraft and wherein said element is embodied in a television camera, since the camera of FIGURE 9 follows the model aircraft while the camera of FIGURE 15 occupies the position of and assumes the various attitudes of the model aircraft;

FIGURE 16 is a view similar to FIGURE 5 showing a third embodiment of the invention in which the gyroscopic climb, turn and bank indicating instruments and a pair of image reproducing tubes are carried by a headpiece or headgear adapted to be worn by the pilot of the aircraft;

FIGURE 17 is an enlarged perspective view of the headpiece shown in FIGURE 16 with the three gyroscopic devices being shown schematically;

FIGURE 18 is an elevation looking at the inside of the visor of the headpiece shown in FIGURE 17 and showing the image of the terrain as though photographed by the television camera of FIGURE 15 as such image might appear on the face of the associated television receiving and image reproducing tubes.

*Synopsis of the Invention*

Although the present invention may be used at other locations and for purposes other than guiding an aircraft, or for responding to vehicles other than an aircraft, the invention is particularly adapted to aid a pilot in navigating an aircraft adjacent an airport and to aid in landing the aircraft, in cases where the visibility is poor, such as when the cloud ceiling is relatively low. Therefore, the area of terrain shown in FIGURE 1 includes a landing field or airport 20 adjacent which a pair of spaced direction finder stations 21, 22 are located, the direction finder station 21 preferably, but not necessarily, being aligned with and spaced from the end of one of the runways of the airport 20, and the other direction finder station 22 preferably being spaced from and aligned with another of the runways of the airport 20. Other objects of the landscape are shown, such as a hill 23 and a forest 24.

An aircraft 26 is shown in flight above and to one side of the airport 20, and a stratus layer of clouds C is shown between the aircraft 26 and the airport 20. The projection of the aircraft on the surface of the earth is indicated at a point 27 which happens to be spaced between the direction finder stations 21, 22.

Figures 1, 2, 3, 4:
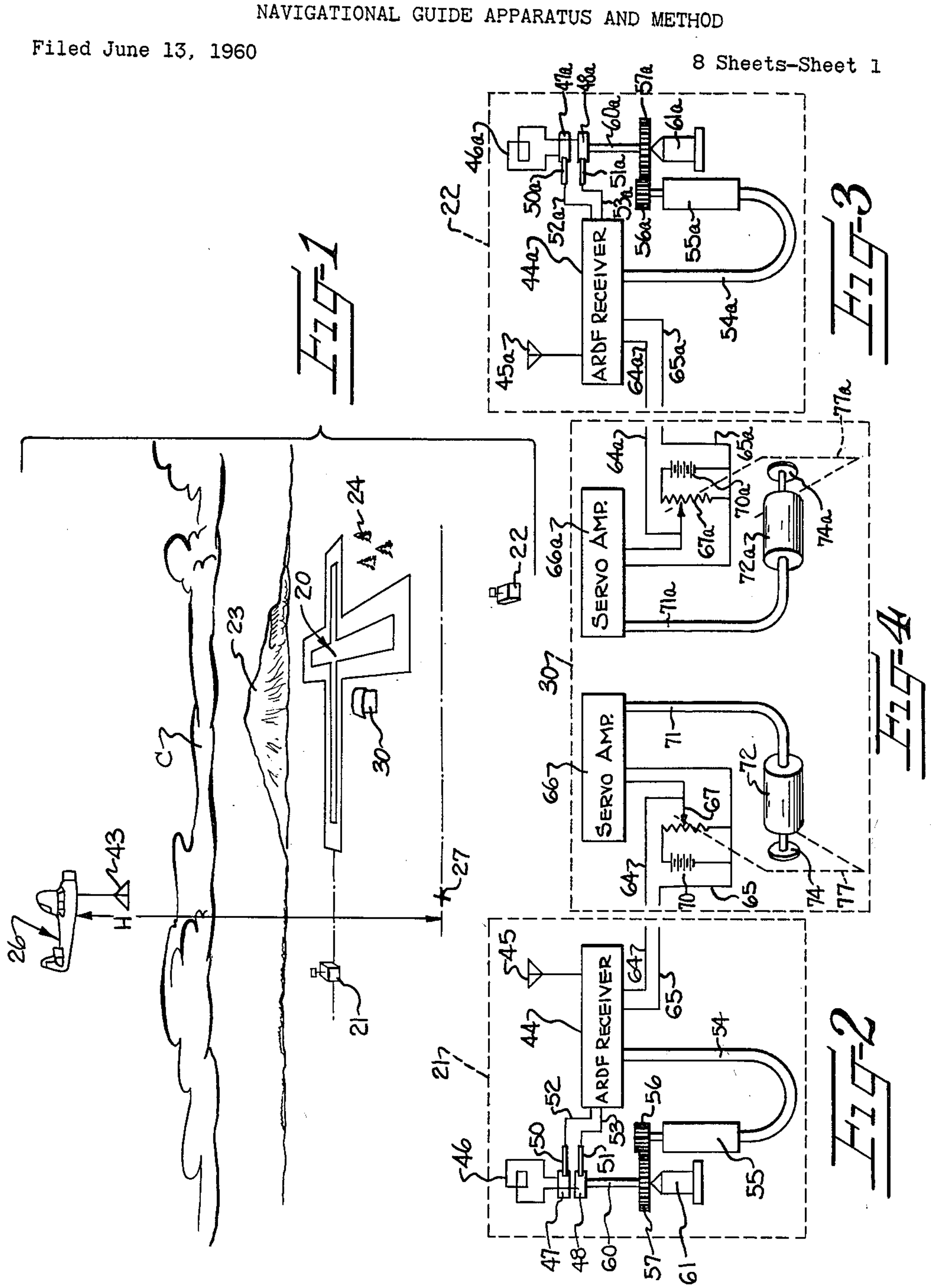
FIGURE 1 is a perspective view of an area of terrain including an airport and direction finder stations, and showing an aircraft in flight adjacent thereto.
FIGURE 2 is a diagrammatic view of elements located in one of the radio direction finder stations.
FIGURE 3 is a diagrammatic view of the elements located in another radio direction finder station.
FIGURE 4 is a diagrammatic view of some of the electrical apparatus located within a flight simulator enclosure or television transmitting station, the elements of FIGURE 4 being those particularly responsive to the radio direction finders of FIGURES 2 and 3.

A building 30, preferably located at the airport 20, serves as a flight simulator station or television transmitting station and contains therein a map 31 (FIGURE 9), preferably in relief, which includes the same topography as that of the actual terrain shown in FIGURE 1. Therefore, the airport and other objects of the landscape shown in miniature in FIGURE 9 shall bear the same reference characters as the actual airport and objects of the landscape shown in FIGURE 1, with the letter "*m*" added.

The building 30 (FIGURE 9) also contains a model element **26*m* representing the actual airplane 26**, and which is, in fact, shown in the form of a model aircraft in the first form of the invention.

The model aircraft **26*m* is supported for vertical, lateral and horizontal movement relative to map 31 and is also supported for movement about its vertical, lateral and longitudinal axes. A television camera 32 is spaced above and rearwardly of the model aircraft 26*m* and is so mounted with respect to the aircraft as to take a panoramic picture of the aircraft and any terrain in front and below the same. In other words, although the camera 32 is preferably inclined downwardly and forwardly, it moves about the vertical axis of the model aircraft (always equally spaced from and uniformly oriented with respect to the model aircraft 26*m*), and it also moves laterally and longitudinally of the map 31 in accordance with the lateral and longitudinal movement of the model aircraft. It is essential that the camera 32 be fixedly disposed, as illustrated, with respect to the model aircraft 26*m*** in this embodiment of the invention.

As will be described hereinafter, the actual aircraft 26 is equipped with a transmitter 41 (FIGURE 5) which, when within the range of the direction finder stations 21, 22, transmits carrier wave signals to radio direction finder receivers 44 and **44*a* within stations 21, 22. When said signals from the transmitter in the aircraft are impressed upon the direction finder receivers 44 and 44*a* at stations 21, 22, the latter relay the radio signal output of receivers 44 and 44*a* to devices (hereinafter described) located within building 30, which devices impart lateral and/or longitudinal movement to the model aircraft 26*m*, relative to the map 31, so the model aircraft 26*m* occupies a position relative to map 31 corresponding to the position occupied by the actual aircraft 26** relative to the actual terrain of FIGURE 1.

Other transmitters in the actual aircraft 26 cause the model aircraft **26*m* to occupy an elevation proportional to that of the actual aircraft 26 above the actual terrain and also cause the model aircraft 26*m* to move about its vertical, longitudinal and lateral axes to substantially the same extent as that to which the actual aircraft 26** moves about its respective vertical, longitudinal and lateral axes.

The first form of the invention is shown in FIGURES 1 through 14, wherein a television receiving tube, a radio altimeter indicating instrument and climb, bank and turn gyroscopic instruments are supported in fixed relation to the actual aircraft 26 (FIGURES 5, 6, 7 and 8), and the television camera 32 (FIGURES 9 and 10) is located rearwardly of and above the element **26*m* corresponding to the aircraft 26**. The first form of the invention will now be described in detail.

*Detailed Description of First Form of Invention*

Referring to FIGURE 1, in particular, the actual aircraft 26 is shown in the form of an airplane flying at an altitude H above the terrain. As shown in FIGURE 5, the aircraft includes an instrument panel 40 adjacent to which an orienting radio carrier wave transmitter 41 is supported, and which may be turned on and off by a suitable switch 42. The orienting transmitter 41 may be of conventional or other construction and need not be described in detail.

The orienting transmitter 41 transmits carrier wave signals of predetermined frequency by means of an antenna 43 which, as shown in FIGURE 1, preferably depends from the aircraft 26. The radio direction finder stations 21, 22 have therein respective automatic radio direction finder receivers 44, **44*a*** of conventional or other construction and which may be of a type described and illustrated in a handbook printed by the United States Government Printing Office under Technical Order No. 08–10–175, as revised September 20, 1943, and entitled Radio Compass SCR–269–G Handbook, and a detailed description of which is thus deemed unnecessary.

Since the parts associated with direction finder station 21 may be identical to the parts associated with radio direction finder station 22, only the parts disposed in radio direction finder station 21 will be described and like parts associated with station 22 will bear the same reference characters with the letter "*a*" added.

The carrier wave signals from the aircraft antenna 43 are picked up by an omnidirectional antenna 45 and a directional or loop antenna 46. Opposed ends of loop antenna 46 are connected to slip rings 47, 48 which are engaged by respective brushes 50, 51 having conductors 52, 53 leading therefrom to the automatic direction finder receiver 44. Antenna 45 extends from the latter receiver 44 and, therefore, the carrier wave signals from the antenna 43 of aircraft 26 are impressed on the automatic radio direction finder receiver 44.

The signals received by antennas 45, 46 cause electrical impulses to be generated within direction finder receiver 44, which impulses are transmitted through a conductor cable 54 to a servomotor 55 within station 21 which thus imparts rotation to the loop antenna 46 through the medium of gears 56, 57 and a post 60 on which the slip rings 47, 48 and loop antenna 46 are mounted. Post 60 and its gear 57 may be journaled in any desired manher and, in this instance, the lower end of post 60 is journaled upon a suitable fixed base 61.

The impulses generated within direction finder receiver 44 are effective to rotate loop antenna 46 about its vertical axis whenever the transmitting antenna 43 of aircraft 26 is laterally displaced with respect to the horizontal axis, of the loop antenna 46, so that, as long as direction finder receiver 44 is within the range of the signals transmitted from aircraft antenna 43, the loop antenna 46 occupies a true null position toward the point 27 indicating the projection of the aircraft 26 on the surface of the earth. Of course, point 27 moves from place to place with the aircraft 26.

It is thus seen that, as the aircraft 26 moves above the terrain, the loop antennas 46, 46a rotate about their respective vertical axes so that they always occupy null positions and establish coordinates with respect to the point of projection 27 of the aircraft 26 on the surface of the earth. As loop antennas 46, 46a rotate, they produce signals of varying magnitude in the respective radio direction finder receivers 44, 44a. The latter signals are conducted from the receivers 44, 44a to the television transmitting station 30 by means of respective pairs of conductors 64, 65 and 64a, 65a. These conductors may extend through protective conduits buried in the earth.

Conductors 64, 65 and 64a, 65a are connected to respective electronic amplifiers 66, 66a located in the building 30. It will be noted that the movable tap or slidewire of a suitable voltage regulator or potentiometer 67 is connected to conductor 64, this potentiometer being placed across the poles of a storage battery 70. One side of battery 70 is connected to conductor 65, its other side is connected to one side of potentiometer 67, and the other side of potentiometer 67 is connected to conductor 65. A potentiometer 67a and battery 70a are interposed in conductors 64a, 65a in the same manner in which the potentiometer 67 and battery 70 are interposed in conductors 64, 65. The amplifiers 66, 66a, which may be termed servo-amplifiers, have respective output cables 71, 71a leading therefrom to servomotors 72, 72a which are located in respective housings 73, 73a (FIGURE 9) and which have respective pulleys 74, 74a thereon which are driven by the respective servomotors 72, 72a to impart transverse and longitudinal movement, respectively, to the model aircraft 26m within the building 30.

The servo-amplifiers 66, 66a are each of a type which will cause current to flow in the respective servomotors 72, 72a in either direction and corresponding to the movements of the loop antennas 46, 46a about their respective axes. In order to insure that the model aircraft 26m is located in the same vertical plane relative to the relief map 31 as the actual aircraft 26 is located relative to the actual terrain of FIGURE 1, potentiometers 67, 67a are arranged to render uncompensated the voltage applied by the radio direction finder receivers 44, 44a with the voltage in the servo-amplifiers 66, 66a whenever the actual aircraft 26 and the model aircraft 26m occupy the same relative positions with respect to the terrain of FIGURE 1 and the map 31 of FIGURE 9.

To this end, it will be observed in FIGURE 9 that the housings for the potentiometers 67, 67a are suitably secured to the ceiling 75 of building 30 at points in vertical alignment with points 21m, 22m on map 31 which coincide with the respective direction finder stations 21, 22. The movable taps of the potentiometers 67, 67a have rocker arms 76, 76a depending therefrom, which rocker arms are loosely penetrated by respective horizontally disposed slidewire couplings 77, 77a, in the form of rods whose mutually proximate ends are adapted to move in a horizontal plane and thereby follow the disposition of rod 80 and hence the vertical axis Z of model 26m at all times. In so doing, the arms 76, 76a move about their respective vertical axes to thus impart corresponding movement to the taps of the respective potentiometers 67, 67a.

In this instance, it will be observed in FIGURE 9 that the proximal ends of the slidewire couplings 77, 77a are pivotally mounted on a post or column 80 provided with a shank 81 which is guided for vertical sliding movement in a sleeve 82 of a primary carriage broadly designated at 83. The shank 81 of post 80 may be keyed in the sleeve 82 or may otherwise be prevented from rotation relative to sleeve 82.

It will be noted that the housing 73 for servomotor 72 is suitably secured to the sleeve 82 of primary carriage 83, and pulley 74 is connected, by a belt 84 to a pulley 85 journaled in a substantially horizontal arm 86 fixed to sleeve 82 and forming a part of carriage 83. Arm 86 of carriage 83 has a pair of rollers 87, 88 journaled thereon which ride upon a transverse track 91, the pulley 87 being integral with or fixedly connected to pulley 85. Thus, whenever, servomotor 72 is energized and pulley 74 is thus caused to rotate in either direction, corresponding rotation is imparted to roller 87 to thus move the primary carriage transversely upon track 91. Track 91 is a part of a secondary carriage 92 and has brackets 93, 94 connected to opposite ends thereof.

Bracket 94 has a pair of rollers 95 journaled thereon and bracket 93 has a pair of rollers 87a, 88a journaled thereon which correspond to the rollers 87, 88 heretofore described. A pulley 85a and endless belt 84a transmit rotation from the pulley 74a to roller 87a in the same manner in which pulley 85 and belt 84 transmit rotation from pulley 74 to roller 87. Pulleys 95 ride upon a longitudinal rail or track 100, and pulleys 87a, 88a ride upon a longitudinal track 101 extending parallel to track 100. Tracks 100, 101 are suitably secured to opposed side walls of building 30.

From the foregoing, it is apparent that any lateral movements of the aircraft 26 relative to direction finder stations 21, 22 are detected by direction finder station 21 to cause carriage 83 to move upon the transverse track 91 in the corresponding direction. With movement of the actual aircraft 26 in a longitudinal direction with respect to the direction finder stations 21, 22 and building 30, direction finder 22 detects such movement and causes carriage 92 to move upon the longitudinal rails 100, 101 in either direction. Of course, as carriage 92 moves longitudinally, it also moves carriage 83 therewith so that the flight path of the actual aircraft 26 over the terrain is reproduced in miniature by the model aircraft 26m over the map 31 of the terrain; since the model aircraft 26m is carried by the post 80, as will be fully described hereinafter. In order to further explain the function of the balancing slidewire couplings 77, 77a, we shall assume that the aircraft 26 is in the vicinity of mountain 23 and is flying directly toward direction finder station 22. Since there is no angular change in the disposition or "facing" of loop antenna 46a at direction finder station 22, it follows that there is no complete composite signal from ARDF receiver 44a to servo amplifier 66a to cause any rotational adjustment of pulley 74a. However, at the direction finder station 21 the progress of the aircraft is sensed and followed by loop antenna 46 (rotating in a clockwise direction looking downward), and this produces a rotation of pulley 74 and a resultant movement of the primary carriage 83 upon the transverse track 91, which moves in a latitudinal direction toward point 22m within building 30. With the movement of the primary carriage 83 upon the transverse track 91 in the direction toward point 22m, post 80 will move along the transverse track as part of the primary carriage 83. Thus, the movement of post 80, as sensed through slidewire coupling 77 and the rocker arm 76, produces a slight clockwise rotation (looking downward) of the stub or shaft control of potentiometer 67, located in a vertical alignment with 21m, so as to cause a slight unbalance in the servo amplifier circuit containing potentiometer 67. Now motor 55 receives from receiver 44 one signal which is continuous regardless of the position of loop 46 and also one additional signal, when the loop 46 is off-null, the phase of this additional signal leading or lagging phase of the continuous signal, so as to co-act with said continuous signal in driving said motor 55, depending upon whether the loop 46 is tracking in a clockwise or counterclockwise direction. Assuming, merely by way of example that these particular output signals are supplied via wire leads 64 and 65 to the servo amplifier and subsequently to motor 72, then, in a loop 46 null period, the continuous signal alone, in combination with battery 70 supplying a bias or control voltage to the servo amplifier, might be utilized to drive motor 72 (via servo amplifier 66 which could include a phase shifting network, as in the SCR 269–G, to compensate for the signal now lacking from 44 to drive disc 74 so as to position post 80 properly) in a direction in accordance with the direction off-center of the tap of potentiometer 67.

Further, it is to be noted that the structure may be so dimensioned and proportioned that a linear relationship exists between the tap of potentiometer 67 and a particular point on the motor shaft and disc 74 of motor 72 so that when the stub or tap of potentiometer 67 is rotationally displaced, as by the movement of post 80, then the control voltage resulting, as applied to servo amplifier 66, will be such as to cause motor 72 to start and to revolve motor shaft and disc 74 so that post 80 will be laterally displaced and hence "catch up with" (i.e., be in correspondence with) the potentiometer 67 (see FIGURE 9) when it corresponds to true aircraft position. When the carriage movement laterally has caught up with the potentiometer 67, then servo correction has been achieved and the disposition of model **26*m*** corresponds with the disposition of the airplane.

In the larger sense potentiometer 67, battery 70, and servo amplifier 66 are symbolic of the electro-mechanical means by which a carriage driving motor is automatically supplied a correction voltage to compensate for deviations of model position from true simulated position to correct the model position to true simulated position.

In order to simulate every movement of the actual aircraft 26, the model aircraft **26*m*** must vary as to its height H–*m* above the map 31 in proportion to the height or altitude H of the actual aircraft. Further, the model aircraft **26*m* must move about its longitudinal axis X, its lateral axis Y and its vertical axis Z (FIGURES 9 and 10) substantially to the same extent to which the actual aircraft 26 moves about its respective longitudinal, lateral and vertical axes. While the extent to which the model aircraft 26*m*** may move about its three principal axes X, Y, Z is limited because of the particular manner in which the model aircraft may be mounted, as will be later described, such movement is sufficient for practical navigational purposes.

Means are provided to cause the model aircraft **26*m* to move up and down relative to the map 31 (FIGURE 9) and about its three principal axes X, Y, Z in response to changes in the elevation of the actual aircraft 26 and in response to variations in the attitude of the actual aircraft 26 about its three principal axes. It will be observed in FIGURE 5 that the aircraft 26 is equipped with a radio-echo altimeter 104 and associated altitude indicating instrument 105, which instrument is preferably mounted in the instrument panel 40. The radio-echo altimeter 104 is of the usual type which bounces a radio signal against the terrain beneath the aircraft 26 and produces a response in the instrument 105 to indicate the actual altitude H of the aircraft 26** above the terrain. Since radio-echo transmitters are well known in the art, a detailed description thereof is deemed unnecessary.

Also, mounted within the actual aircraft 26 and in fixed relation thereto, are three gyroscopic instruments, namely, a climb gyro 106, a bank gyro 107 and a turn or directional gyro 108 (FIGURES 6, 7 and 8). The directional gyro may be manually adjusted to the desired compass heading or it may be in the form of a magnetic gyro compass. The cases or housings of the gyros 106, 107, 108 are provided with respective gyroscopically operated slidewires or taps 111, 112, 113 which engage respective resistors 114, 115, 116 supported in fixed relation to the housings of the respective gyroscopic instruments 106, 107, 108. The gyroscopic instruments 106, 107, 108 have respective pairs of wires or conductors 120, 121, 122 extending from the resistors and slidewires thereof and whose other ends are connected to respective reactance modulators 123, 124, 125.

Radio altimeter 104 also has conductors 126 leading therefrom to a reactance modulator 127 and conductors 130 connect conductors 126 to the altimeter indicating instrument 105. The reactance modulators 123, 124, 125, 127 are connected to respective frequency modulated transmitters 131–134 which transmit signals, at different radio frequencies, through respective antennas 137–140. Of course, orienting transmitter 41 transmits at a different radio frequency from that of any of the frequency modulated transmitters 131–134. It should be noted that the axes of the gyroscopic instruments 106, 107, 108 should be arranged in the aircraft 26 so that they are parallel to the lateral axis, the longitudinal axis, and the vertical axis, respectively, of the actual aircraft 26.

Four frequency modulated radio receivers **131*a*–134*a*, corresponding to the frequency modulated radio transmitters 131–134, are located in the building 30 (FIGURES 9 and 11–14). Receivers 131*a*–134*a* are tuned to the frequencies of the respective frequency modulated transmitters 131–134 and convert the signals received thereby to linear or rotary motion to impart movement, as hereinafter explained, to the model aircraft 26*m*** about its lateral, longitudinal and vertical axes and up and down, respectively.

It might be stated that, since transmitters 131–134 (FIGURE 5) are frequency modulated transmitters, the reactance modulators 123, 124, 125, 127 produce slight variations in the frequency transmitted by the respective frequency modulator transmitters, in accordance with changes in the attitude and altitude of the aircraft 26. Thus, each of the frequency modulated receivers **131*a*–134*a*** includes conventional means for demodulating the frequency modulated waves, such means being shown diagrammatically in the form of a discriminator. Since the structure associated with each of the frequency modulated receivers in FIGURES 11–14 is substantially the same, only the structure of FIGURE 11 will be described and like reference characters shall apply to the structure shown in FIGURES 12, 13 and 14 with the letters "*a*," "*b*," and "*c*" applied thereto, respectively, in order to avoid repetitive description.

Receiver **131*a* receives signals from the antenna 137 of frequency modulator transmitter 131 (FIGURE 6) by means of an antenna 145. The receiver 131*a* feeds the signals received thereby into a discriminator 146 having conductors 147, 148 leading therefrom to a servo-amplifier 151. The movable tap or slidewire of a suitable voltage regulator or potentiometer 152 is connected to conductor 147 and the resistor of the potentiometer is connected across the poles of a storage battery 153. One side of battery 153 is connected to conductor 148, the other side of battery 153 is connected to the resistor of potentiometer 152, and the other side of the latter resistor is connected to conductor 148. The slidewire or movable tap of potentiometer 152 is controlled by a suitable slidewire coupling 154 which is movable in response to movement of a shaft 155 of a servomotor 156. Slidewire coupling 154 represents any suitable mechanical coupling between the shaft 155 and the movable tap of potentiometer 152**.

The servomotor 156 is connected to servo-amplifier 151 by means of a cable 157 containing suitable conductors therein. Shaft 155 is driven in either direction in response to the signals received by receiver **131*a* from transmitter 131. In so doing, shaft 155 drives a transmitter selsyn or autosyn transmitter 160. With the exception of the exposed end of the antenna 145, the elements thus far described with respect to FIGURE 11 may be located within a suitable housing 161, which is shown mounted on one of the side walls of building 30** in FIGURE 9.

Transmitter selsyn 160 has conductors 162 leading therefrom through a cable or conduit 163. The conductors 162 extend out of housing 161 and are connected to a receiver selsyn or autosyn slave 164 from which a shaft 165 extends. Shaft 165 has a disc 166 fixed thereon.

The selsyns 160, 164 may be of a type such as are disclosed in a booklet published by General Electric, Schenectady, New York, under their No. GEA–2176C, dated June 1951, and entitled "Selsyns." The selsyns may also be of a type disclosed in said handbook entitled "Radio Compass SCR–269–G Handbook." Accordingly, a detailed illustration and description thereof is deemed unnecessary. It might be stated, however, that the selsyns 160, 164 are usually in the form of three-phase electric motors, which are so interconnected that, when the transmitter selsyn tends to be out of phase with the receiver selsyn due to rotation of shaft 155, the shaft 165 of receiver selsyn 164 rotates and maintains the receiver selsyn 164 in phase with the transmitter selsyn 160.

As heretofore stated, the four frequency modulated receivers **131*a*–134*a* in building 30 correspond to the radio transmitters 131–134 in the actual aircraft 26. Thus, the structure shown in FIGURE 11 effects the movement of the model aircraft 26*m* about its lateral axis Y (FIGURE 10), the structure disclosed in FIGURE 12 effects movement of the model aircraft 26*m* about its longitudinal axis X, the structure shown in FIGURE 13 effects movement of the model aircraft 26*m* about its vertical axis Z, and the structure shown in FIGURE 14 effects vertical movement to the model aircraft 26*m* toward and away from the map 31**, by other means to be later described.

The slidewire couplings between shafts **155–155*c* and the taps or slidewires of the respective potentiometers 152–152*c* may be arranged similar to the slidewire couplings 77–77*a* (see upper portion of FIGURE 9) or, if desired, a gear train may be provided medially of each shaft 155–155*c* and the tap of the respective potentiometer 152–152*c*. With respect to the shafts 155*b* and 155*c*, since it may be necessary that these shafts rotate more than a revolution in order to produce the required movement of the model aircraft 26*m* about its vertical axis and along its vertical axis, it is apparent that the gear trains between the shafts 155*b*, 155*c* and the taps of the respective potentiometers 152*b*, 152*c* should then be in the form of reduction gearing so that only a relatively short movement is imparted to the taps of the potentiometers 152*b*, 152*c* with each revolution of the respective shafts 155*b*, 155*c***.

The taps of potentiometers 152, **152*a*, however, may move or rotate at the same speed as the respective shafts 155, 155*a*, since the latter shafts need not necessarily move more than a partial revolution during the course of the entire range of movement of the model aircraft 26*m*** about its respective lateral and longitudinal axes.

The manner in which the strucures of FIGURES 11–14 effect movement of the model aircraft **26*m* about its lateral and longitudinal axes, toward and away from map 31**, and about its vertical axis, respectively, will now be described.

Figure 10:
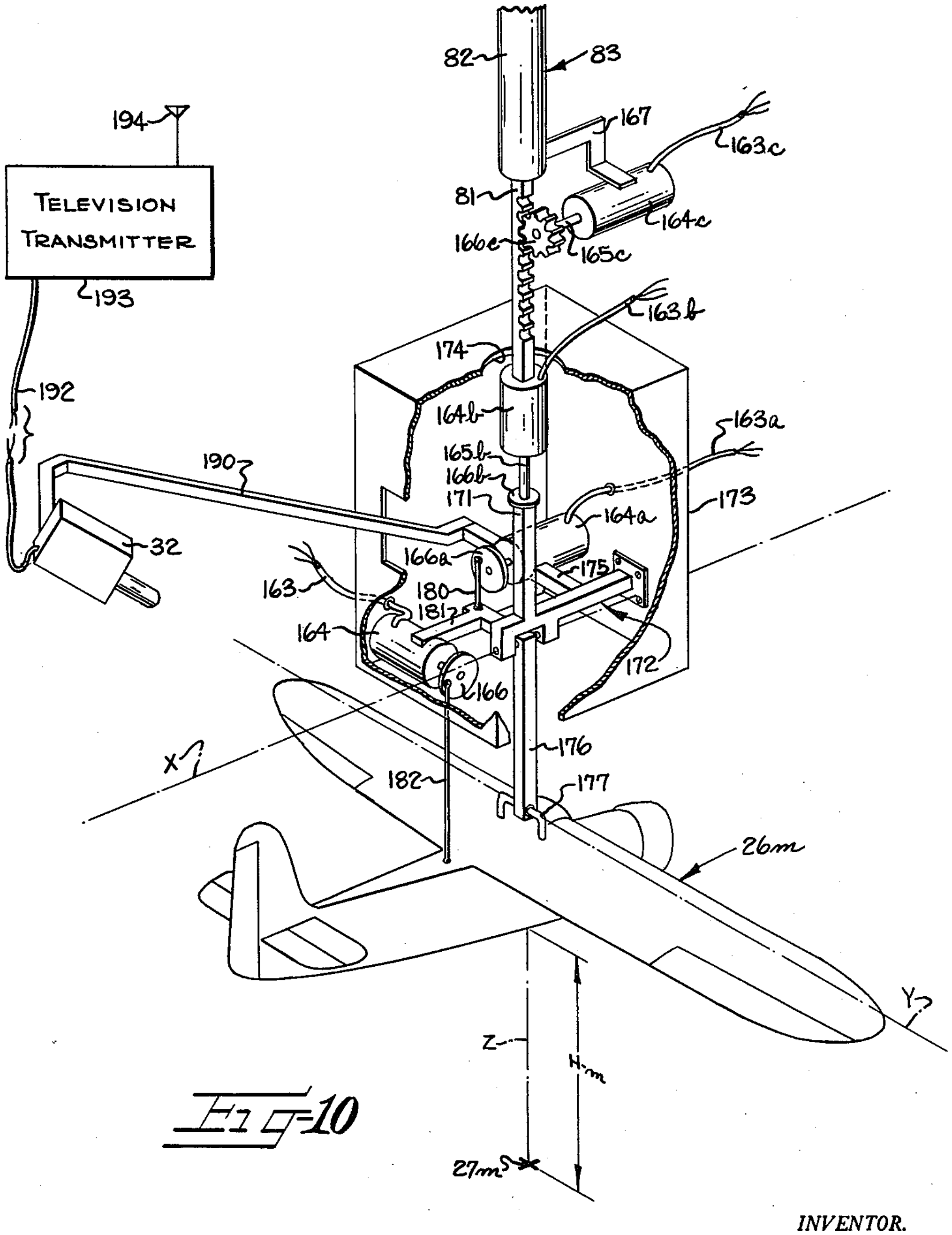
FIGURE 10 is an enlarged perspective view of the lower central portion of FIGURE 9, with other parts broken away.
Figure 11:
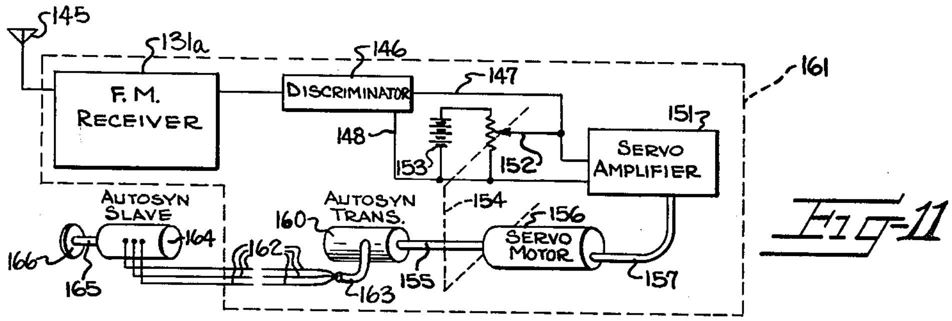
Figure 12:
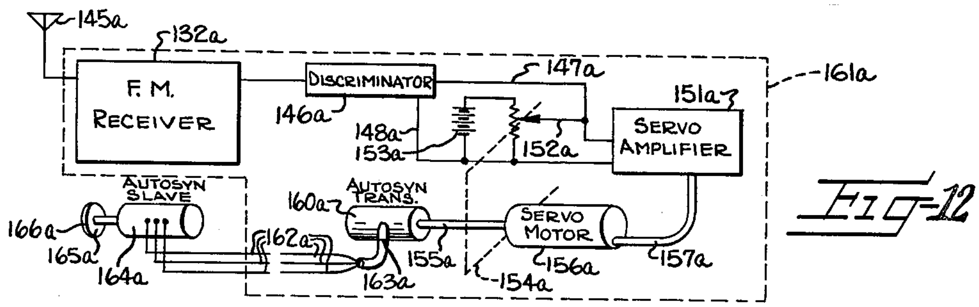
Figure 13:
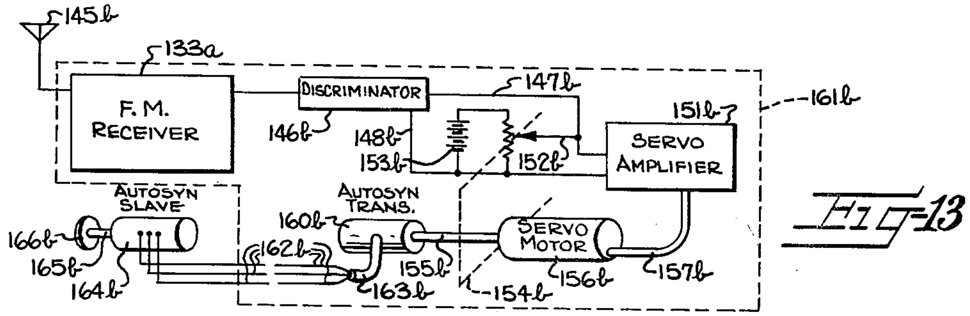
Figure 14:
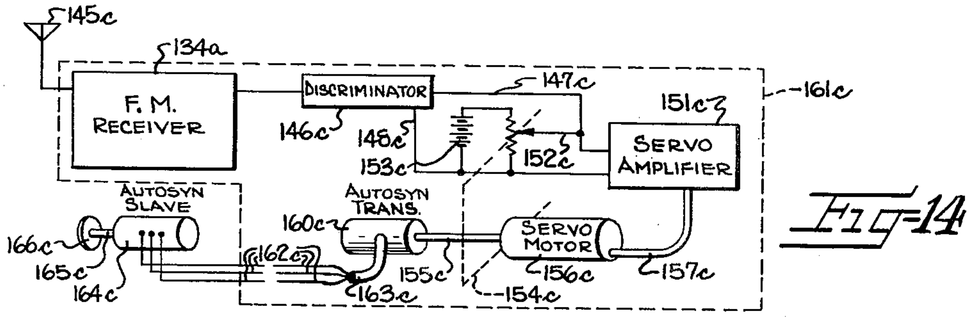

In FIGURES 9 and 10, it will be noted that the disc **166*c* is in the form of a gear or pinion whose teeth engage teeth provided on the shank 81 of the vertical shaft 80. Thus, shank 81 also serves as a rack engaged by pinion 166*c*. Autosyn slave or receiver selsyn 164*c* is carried by a bracket 167 suitably secured to or formed integral with the sleeve 82 of carriage 83**.

The lower end of rack or shank 81 is attached to one end of the casing of receiver selsyn **164*b*, and the disc 166*b* is attached to an upright portion 171 of a composite bracket broadly designated at 172 (FIGURE 10). Bracket 172 is attached to one wall of an open-bottomed housing or shield 173 whose upper wall has a relatively small opening 174 therein through which the lower portion of rack 81** extends.

Since bracket 172 is attached to shield 173, shield 173 is raised and lowered with rack 81, receiver selsyn **164*b*, its shaft 165*b*, disc 166*b* and bracket 172. Bracket 172 is provided with a lateral extension 175 to which the casing of receiver selsyn 164*a* is suitably secured. Bracket 172 has the upper end of an inverted L-shaped link 176 pivotally connected thereto on an axis parallel to the longitudinal axis of the model aircraft 26*m*. In fact, the point at which link 176 is connected to bracket 172 may form the longitudinal axis X of model aircraft 26*m***.

The lower end of link 176 pivotally supports the model aircraft **26*m* by means of a yoke 177 loosely penetrating the lower end of link 176 in parallel relation to the lateral axis Y of model aircraft 26*m*. Yoke 177, as shown, may be suitably attached to the wing of model aircraft 26*m*. Link 176 is of inverted L-shaped construction and its upper arm has the lower end of a link 180 pivotally connected thereto, whose upper end is eccentrically and pivotally connected to the outer surface of disc 166*a***.

Since receiver selsyn **164*a* is supported in fixed relation to bracket 172, it is apparent that rotation of disc 166*a* in either direction imparts corresponding movement to link 176 and imparts corresponding movement to the model aircraft 26*m*** substantially about its longitudinal axis X.

The upper arm of inverted L-shaped link 176 has a rearwardly extending portion 181 integral therewith or suitably secured thereto, to which the casing of receiver selsyn 164 is suitably secured. The axis of receiver selsyn 164 extends substantially parallel to the lateral axis Y of model aircraft **26*m*, and the disc 166 has the upper end of a link 182 eccentrically and pivotally connected thereto. The lower end of link 182 is pivotally connected to the model aircraft 26*m* at a point rearwardly of the lateral axis Y thereof so that rotation of disc 166** in either direction rotates the model aircraft about its lateral axis Y.

From the foregoing, it is apparent that receiver selsyn **164*c* imparts vertical movement to the model aircraft 26*m* in response to variations in altitude of the actual aircraft 26 above the actual terrain (FIGURE 1) as detected by the radio altimeter 104. The directional gyro 108 orients the model aircraft 26*m*, because, as soon as a signal is received from transmitter 133 by receiver 133*a*, model aircraft 26*m* turns to face toward the same azimuthal direction relative to map 31 as the actual aircraft 26 faces with respect to the actual terrain. As the actual aircraft 26 moves about its vertical axis, the tap 113 of the gyroscopic directional instrument or turn gyro 108 rotates relative to resistor 116 to correspondingly vary the frequency of frequency modulated transmitter 133, in response to which selsyn 164*b* imparts corresponding rotation to the model aircraft 26*m*** about its vertical axis Z.

As model aircraft **26*m* is moved about its vertical axis, the receiver selsyns 164, 164*a* also move therewith, since they are carried by composite bracket 172. It is apparent that the gyroscopic bank detecting instrument or bank gyro 107 of FIGURE 7 also detects any movements of the actual aircraft about its longitudinal axis and causes receiver selsyn 164*a* to rotate disc 166*a* correspondingly and to thereby move model aircraft 26*m* substantially about its longitudinal axis X in substantially the same manner in which the turn gyro 108 produces movement of the model aircraft 26*m* about its vertical axis Z. The climb gyro 106 operates in substantially the same manner as the bank and turn gyros 107, 108 to cause selsyn 164 to rotate disc 166 in a direction corresponding to movement of the actual aircraft about its lateral axis to thus cause the model aircraft 26*m*** to move correspondingly about its lateral axis Y.

In order to notify the pilot of the actual aircraft 26 as to the height H–*m* of the model aircraft **26*m* above the map 31, as to the projected position 27*m*** of the model aircraft above the map 31 and the attitude thereof about its three principal axes X, Y and Z, and to thus notify the pilot as to the altitude H of the actual aircraft 26, the projected position 27 of the actual aircraft with respect to the earth and the attitude of the actual aircraft about its three principal axes, in the first embodiment of the invention, the actual aircraft 26 is provided with a television receiver amplifier 185 (FIGURE 5) having a receiving antenna 186 extending therefrom and which also has an electrical cable or conduit 188 extending therefrom to an image reproducing tube or television tube 187, of usual construction, and which is shown mounted in the instrument panel 40.

The television camera 32 is located above the longitudinal axis X of the model aircraft 26*m* and sufficiently rearwardly of the vertical axis Z of the model aircraft 26*m* so as to photograph and transmit a panoramic view of the model aircraft 26*m*, the terrain and other objects in front of the model aircraft 26*m* shown on the map 31. The television transmitting camera 32 may be supported in the position heretofore described by means of an upwardly and rearwardly extending arm 190 connected to the outer end of the lateral portion 175 of bracket 172.

Television camera 32 is connected, by an elongate flexible electrical conduit or cable 192, to a suitable television transmitter 193 having an antenna 194 connected thereto for transmitting wireless signals, propagated by the image picked up by the television camera, to be received by the antenna 186 of the television receiver 185 (FIGURE 5), where they are amplified in a well-known manner and then impressed upon the image reproducing tube 187. Since the television camera 32 rotates about the vertical axis Z with the model aircraft 26*m*, and such rotation is effected by turning movement of the actual aircraft 26 about its own vertical axis, it is thus seen that the image reproduced on the tube 187 (FIGURE 5) corresponds to whatever the pilot could see in clear weather, if he could follow every movement of the actual aircraft at a point above and rearwardly of the empennage thereof.

In FIGURES 9 and 10, the cables 163, 163*a*, 163*b*, 163*c* are shown connected directly to the respective receiver selsyns 164–164*c*. However, since the model aircraft 26*m* may be required to rotate entirely about its vertical axis Z one or more times, in order to respond to the movement of the actual aircraft 26, it is apparent that means may be provided which will permit rotation of the model aircraft 26*m* about its vertical axis while corresponding ends of the conduits 163–163*c* remain stationary. For example, the lower portion of the rack or shank 81 may have a number of slip rings (not shown) mounted thereon and insulated therefrom, to which the cables 163–163*c* may be attached. Relatively short electrical cables or conduits could then be connected to the slip rings by means of suitable brushes, similar to the slip rings 47, 48 and brushes 50, 51 associated with the loop antenna 46 of FIGURE 1, with the latter cables being connected to the respective receiver selsyns 164–164*c*.

*Second Form of the Invention*

FIGURE 15 illustrates an alternative arrangement with respect to the structure shown in FIGURES 9 and 10. In FIGURE 15, the secondary carriage 92′ is supported on rails or tracks 100′ and 101′ below the level of the television camera 32′ which is now used in the place and position of model 26*m*. In all other respects, the structure shown in FIGURE 15 is substantially the same as the structure shown in FIGURES 9 and 10 and, therefore, those elements of FIGURE 15 corresponding to elements shown in FIGURES 9 and 10 shall bear the same reference characters with the prime notation added, in order to avoid repetitive description. The secondary carriage may be driven from either side thereof. Thus, in FIGURE 9, secondary carriage 92 has its driven roller 87*a* mounted on track 101 while, in FIGURE 15, driven roller 87*a*′ for carriage 92′ is mounted on track 100′.

The tracks 100′, 101′ of FIGURE 15 are fixed to opposed side walls of building 30′ closely adjacent the relief map 31′. Therefore, brackets (uprights) 93′, 94′ are considerably longer than brackets 93, 94 (FIGURE 9) in order to support transverse track 91′ on substantially the same level as track 91 previously used.

It should be noted that television camera 32′ (FIGURE 15) is suspended from links 176′, 182′ in substantially the same manner in which model aircraft 26*m* (FIGURES 9 and 10) is suspended from links 176, 182, and since shield 173′ contains the same elements as shield 173, it follows that camera 32′ performs in the same manner as the model aircraft 26*m* as previously described. However, instead of scanning and transmitting a view of the model aircraft to the television receiving tube or image reproducing tube 187, as is the case with the first form of the invention, the television camera 32′ transmits a moving picture of the changing model scenery directly in front of the same, in correspondence with the changing attitude of the aircraft, so that the image reproduced on the television receiving tube 187 of FIGURE 5 corresponds to that which would be visible to a pilot looking forwardly from the aircraft 26 if the terrain below was visible.

Camera 32′ shall be mounted so that the axes of camera 32′ are substantially parallel with the respective axes of the model aircraft 26*m* used in the previous embodiment. However, the actual longitudinal, lateral and vertical axes of camera 32′ need not coincide with the longitudinal, lateral and vertical "pivot" axes thereof, if desired.

The second form of the invention, wherein the television camera 32′ serves as the model element which reproduces the movements of the actual aircraft 26, may be used, in lieu of the structure shown in FIGURES 9 and 10, with the arrangement of the image reproducing tube 187, (FIGURE 5) and the climb, bank and turn gyros shown in FIGURES 6, 7 and 8. The second form of the invention is also particularly adapted for use in response to an actual aircraft equipped according to the second form of the invention shown in FIGURES 16, 17 and 18. In these figures, it will be noted that the aircraft, indicated at 26″, is equipped with substantially the same type of equipment provided in the aircraft 26 of FIGURE 5, and including climb, bank and turn gyroscopic instruments of the type shown in FIGURES 6, 7 and 8.

The structure shown in FIGURES 16, 17 and 18 differs from that of FIGURES 5, 6, 7 and 8 in that the climb, bank and turn gyros, and a pair of image reproducing tubes are mounted in a headpiece or helmet adapted to be worn by the pilot (FIGURE 16). Since most of the structure shown in FIGURES 16, 17 and 18 is similar to structure shown in FIGURES 5, 6, 7 and 8, those parts in FIGURES 16, 17 and 18 which correspond to like parts shown in FIGURES 5, 6, 7 and 8 shall bear the same reference characters with the double prime (″) notation added, in order to avoid repetitive description.

In the aircraft 26″ of FIGURE 16, the orienting radio transmitter 41″, the radio-echo altitude indicating instrument 105″ and the television receiver amplifier 185″ may be arranged in the same manner in which the respective elements 41, 105, and 185 are arranged in the actual aircraft 26 in FIGURE 5. However, it will be noted that the climb gyro 106″, the bank gyro 107″ and the turn gyro 108″ in FIGURES 16 and 17 are attached to the side, rear and top portions, respectively, of a headpiece or helmet 200 which is adapted to be worn on the head of the pilot of the aircraft 26.

Helmet 200 is provided with a movable visor 201 pivotally connected to the helmet, as at 202. Suitably supported within visor 201 are two relatively small image reproducing or television receiving tubes 187″ which are suitably connected to the common electrical cable 188″ leading to the television receiver amplifier 185″. The television receiving tubes 187″ are spaced apart within visor 201 as shown in FIGURE 18 so as to be alined with the eyes of the pilot when the visor occupies lowered position.

It is apparent that the television receiving tubes 187″ may receive the image from either of the television cameras 32 or 32′ in the manner heretofore described. However, it is advantageous to utilize the arrangement of FIGURE 15 when the pilot wears the helmet 200, since the pilot may then look in any desired direction, and the arrangement of the climb, bank and turn gyros 106″, 107″, 108″ is such that the camera 32′ (FIGURE 15) will turn and move in synchronism with movement of helmet 200.

In other words, referring to FIGURE 17, it will be noted that the climb gyro 106″ is so positioned on the helmet 200 that any movement of the pilot's head about its lateral axis or forwardly and rearwardly will cause resistor 114″ to move relative to the gyroscopically controlled slidewire 111″. Further, the bank gyro 107″ is so mounted on helmet 200 that movement of the pilot's head from side to side, about its longitudinal axis, causes resistor 115″ to move relative to the gyroscopically controlled slidewire 112″. Likewise, the turn gyro 108″ is so mounted on the top of the helmet 200 that any movement of the pilot's head about its vertical axis causes resistor 116″ to rotate relative to the gyroscopically controlled slidewire 113″.

As relative movement is effected between any of the slidewires 111″, 112″, 113″ and the respective resistors 114″, 115″, 116″, the respective reactance modulators 123″, 124″, 125″ and frequency modulated transmitters 131″, 132″, 133″ transmit correspondingly varying signals to the frequency modulated receivers 131*a*, 132*a*, 133*a*, (see FIGURES 11–13) which function in the manner heretofore described with respect to the first form of the invention, to cause the television camera 32′ to move in synchronism with movements of helmet 200 as effected by movement of the pilot's head. In the instance of the camera 32′ of FIGURE 15 being used, it is apparent that the television tubes 187″, in the visor 201 of helmet 200, present image portions of the model of the terrain 31′ corresponding to the view of the actual terrain which would be seen by the pilot if the visor was raised above his line of vision and his vision was not otherwise obscured by fog, smoke or clouds surrounding the actual aircraft 26″ or intervening between the aircraft 26″ and the actual terrain therebelow.

When the visor 201 occupies the lowered position shown in FIGURE 16, the pilot cannot see the altitude indicator 105″ and other engine or navigation instruments carried by the instrument panel 40″, since they are obscured by the visor 201. Since engine instruments, at least, must be scanned by the pilot at frequent intervals during operation of the aircraft 26″, the aircraft 26″ may be equipped with a television camera 205 suitably supported in fixed relation to the aircraft 26″, and which is directed toward the instrument panel 40″. Television camera 205 is provided with a manual switch 206 so that the pilot may turn the camera 205 on and off whenever he desires to do so. An electric cable or conduit 207 extends from camera 205 to a transmitting amplifier 210 shown in block form in the lower portion of FIGURE 16. The transmitting amplifier 210 has a cable 211 extending therefrom to the television receiver amplifier 185″.

Switch 206 may be so arranged as to cut out the usual radio frequency amplifier portion of the television receiver amplifier 185″ whenever switch 206 is moved to "on" position so the television tubes 187″ then present views of the instrument panel 40″ to the eyes of the pilot. On the other hand, when switch 206 is moved to "off" position, the switch 206 may be so arranged as to cut out the transmitter 210 and to cut in the radio frequency amplifier of the television receiver amplifier 185″ so the image of the portion or portions of the map 31′ scanned by the television camera 32′ is then visible on the television receiving tubes 187″, as shown in FIGURE 17.

It is thus seen that I have provided a novel apparatus and method particularly adapted for the navigation of aircraft in flight above a given area of terrain or when the aircraft is taxiing upon the land, and wherein a model element representing the aircraft is raised and lowered and moved about its three principal axes relative to a map or reduced scale miniature of the terrain, and in synchronism with movements of the actual aircraft or movements of the head of the pilot in an actual aircraft, with means for transmitting pictorial views of portions of the map or model of the terrain to the pilot of the actual aircraft, which views would appear exactly the same as the scenery would appear to the pilot of the actual aircraft if the pilot were able to see the actual terrain, regardless of the direction in which the aircraft may be heading.

Although the model element has been described herein as being moved relative to a map of the terrain and in response to the movement of the actual aircraft, it is to be understood that the model element (i.e., model 26*m* or camera 32′) may remain stationary and the model terrain or relief map may move relative to the model element in each instance for transmitting the same type of intelligence to the pilot of the actual aircraft, without departing from the spirit of the invention. It is also to be understood that the principles of the present invention are applicable to aircraft carriers, flight simulators, airway traffic control systems and guided-missile control systems and may also be used in the navigation and control of vehicles which move upon land or water, without departing from the spirit of the invention.

In the drawings and specification there have been set forth preferred embodiments of the invention and, although specific terms are employed, they are used in a generic and descriptive sense only and not for purposes of limitation, the scope of the invention being defined in the claims.

I claim:

1. A method of providing a visual reproduction of an aircraft's path of travel, attitude and altitude which comprises transmitting from the aircraft a plurality of different radio signals in response to changes in location, to changes in bank, turn and climb attitudes and to changes in the altitude of the aircraft, respectively, with respect to a given area of terrain, and automatically moving a model element representing the aircraft in a path over a map of said terrain, about its longitudinal, vertical and lateral axes and up and down in synchronism with the aircraft and in response to the respective signals from said aircraft.

2. A method of transmitting navigational information to the pilot of an aircraft which comprises transmitting radio signals from the aircraft, moving a three-dimensional model airplane element corresponding to the aircraft, under control of said signals, about its three principal axes and from place to place in the same attitude and relationship to a map, of scenery adjacent to a given location, as said aircraft moves relative to said scenery, and transmitting to the aircraft a moving picture of the relief map and model airplane element as observed at all times from a point fixed with respect to the intersection of the three principal axes of said model airplane element.

3. In a navigational guide system for aircraft, a scale map of an actual area of terrain, television camera means disposed over and directed toward said map for generating television signals in accordance with that which it sees, an aircraft, telemetering means disposed in said aircraft for transmitting signals reflecting intelligence as to position of said aircraft with respect to said area of terrain, telemetering receiving means disposed proximate and connected to said television camera means and responsive to said intelligence signals for determining the position of said television camera in the same relationship with said map as said aircraft is disposed relative to said area of terrain, a headpiece to be worn by the pilot in said aircraft, telemetering means coupled to said headpiece for transmitting signals bearing intelligence as to head orientation, and telemetering receiving means coupled to said television camera means and responsive to said last mentioned signals for rotatably orienting said camera with respect to said map in correspondence with head orientation with respect to said area of terrain, and television reproduction apparatus affixed to said headpiece and responsive to said television camera means signals for reproducing for the pilot that seen by said television camera means, the pilot thereby seeing by television that portion of said area of the terrain which he would see were his vision unobstructed.

4. Structure according to claim 3 wherein said system includes television means for rendering a pictorial display of the instrument panel of said aircraft, and switch means for alternatively and selectively coupling said pictorial display television means and said television camera means signals to said television reproduction apparatus affixed to said headpiece.

5. In a navigational guide system for aircraft, an aircraft including radio means for transmitting radio signals including altitude intelligence, a pair of spaced direction-finder stations located on the ground proximate a given terrain, said direction-finder stations including respective rotatable radio-receiver loop means for following said aircraft in direction-finder correspondence with its line of flight, a map of said terrain, a three-directional element movably disposed over said map, and means responsive to said radio signals including said altitude intelligence and also responsive to the movements of said receiver loops for automatically moving said element up and down and from place to place over said map, to simulate the flight-path of said aircraft over said terrain.

References Cited in the file of this patent

UNITED STATES PATENTS

| | | |
|---|---|---|
| 2,027,530 | Hammond | Jan. 14, 1936 |
| 2,824,304 | Dorsett | Feb. 18, 1958 |
| 2,959,779 | Miller et al. | Nov. 8, 1960 |

FOREIGN PATENTS

| | | |
|---|---|---|
| 157,494 | Australia | Sept. 25, 1952 |

OTHER REFERENCES

Research and Development on Aircraft Proximity Warning and Collision Avoidance Techniques, by Bendix Radio, April 30, 1958, pages 35, 36 relied on.

Tolson et al.: Abstract of application Serial Number 697,420, published March 18, 1962, 656 O.G. 885–6.